US010225692B2

(12) United States Patent
Drake

(10) Patent No.: US 10,225,692 B2
(45) Date of Patent: Mar. 5, 2019

(54) PROXIMITY DETECTION WITH ULTRA SHORT-RANGE CELLULAR BEACON

(71) Applicant: T-Mobile USA, Inc., Bellevue, WA (US)

(72) Inventor: Aaron Drake, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/659,551

(22) Filed: Jul. 25, 2017

(65) Prior Publication Data

US 2019/0037346 A1 Jan. 31, 2019

(51) Int. Cl.
*H04W 4/80* (2018.01)
*H04W 4/02* (2018.01)
*H04M 1/725* (2006.01)

(52) U.S. Cl.
CPC ....... *H04W 4/023* (2013.01); *H04M 1/72572* (2013.01); *H04W 4/80* (2018.02)

(58) Field of Classification Search
CPC ....... H04W 4/023; H04W 4/80; H04W 4/008; H04M 1/72572
See application file for complete search history.

(56) References Cited

U.S. PATENT DOCUMENTS

| 2012/0246074 | A1 | 9/2012 | Annamalai et al. |
| 2014/0159859 | A1 | 6/2014 | Karam et al. |
| 2014/0274127 | A1 | 9/2014 | Beidel |
| 2015/0180547 | A1 | 6/2015 | Gormley et al. |
| 2016/0323975 | A1 | 11/2016 | White et al. |
| 2016/0345264 | A1* | 11/2016 | Alameh ............ H04W 52/0229 |
| 2017/0295459 | A1* | 10/2017 | Kim ......................... G01S 1/68 |

OTHER PUBLICATIONS

International Search Report and Written Opinion for PCT Application No. PCT/US2018/042735, dated Nov. 7, 2018, 14 pages.

* cited by examiner

*Primary Examiner* — Chuong A Ngo
(74) *Attorney, Agent, or Firm* — Han Santos, PLLC

(57) ABSTRACT

One or more ultra short-range cellular data beacons may be used for proximity detection of in-range client devices that utilize cellular data protocols such as LTE (Long Term Evolution). The ultra short-range cellular data beacons may complete an electronic handshake with in-range client devices. The in-range client devices may provide a client device identifier to the ultra short-range cellular data beacon as part of the electronic handshake. A time receipt of the electronic handshake, a client device identifier, and the ultra short-range cellular data beacon that completed the electronic handshake may be provided.

20 Claims, 7 Drawing Sheets

PROXIMITY DETECTION WITH ULTRA SHORT-RANGE CELLULAR BEACON

BACKGROUND

Proximity detection is useful in a variety of contexts including inventory management, building security, and environmental mapping and navigation. One proximity detection technology known as RFID (radio-frequency identification) uses an RFID reader that interrogates RFID tags to gather data stored in the RFID tag. Other proximity detection strategies include logging Wi-Fi signals to gather a general area of where a device has been in range of different Wi-Fi routers.

However, existing solutions to proximity detection often require specialized hardware and/or only yield location ranges measured in city blocks. For example, RFID systems require specialty hardware for both the RFID reader and the RFID tag and Wi-Fi proximity strategies offer a very general detection location. Furthermore, detecting a device location using Wi-Fi may require a user to interact with the device (e.g. login to the Wi-Fi network) to log the Wi-Fi signals to gather data relevant to location.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
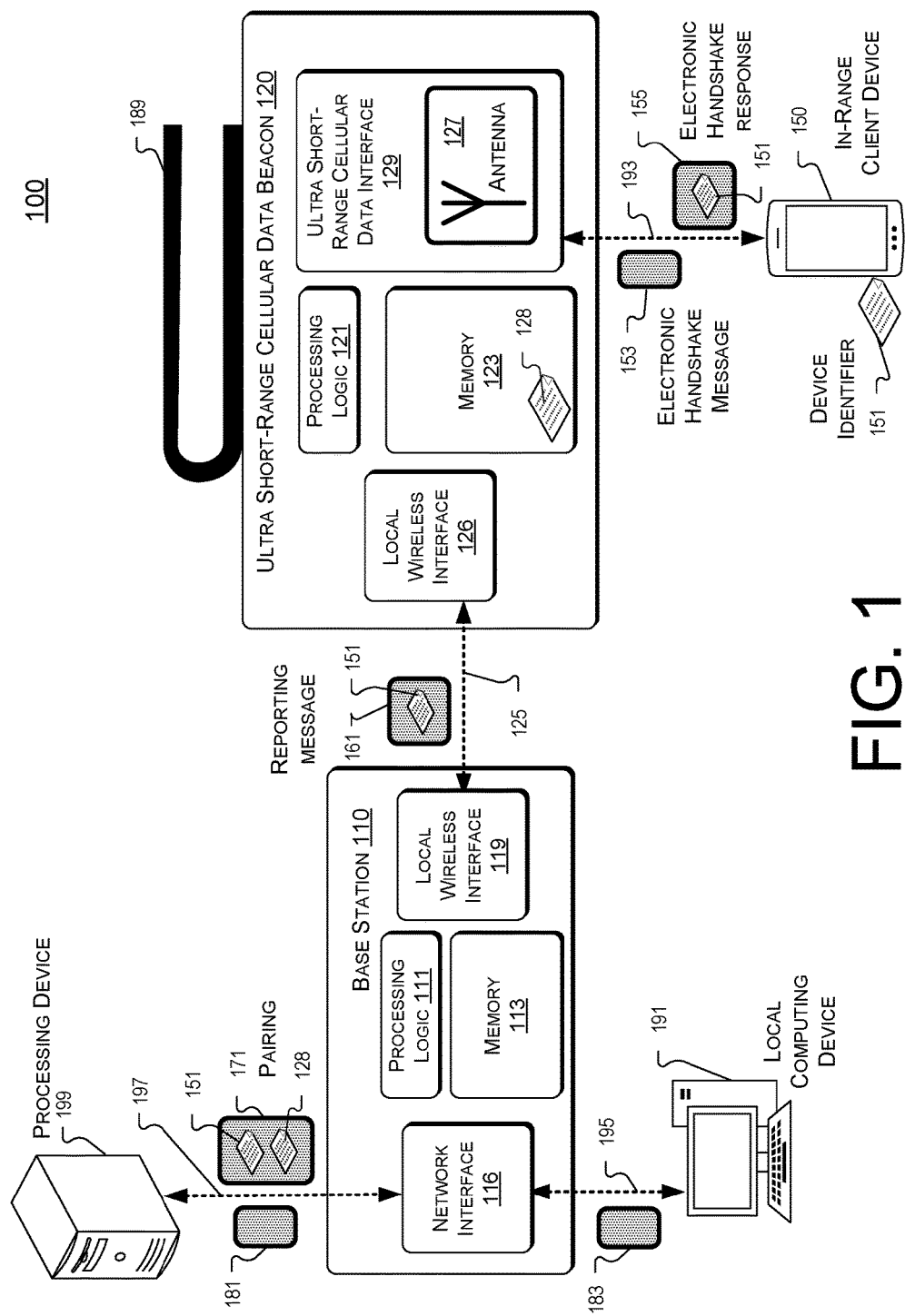
FIG. 1 illustrates an example architecture including an example base station and an example ultra short-range cellular data beacon for detecting a proximity of a client device.

This disclosure is directed to short-range proximity detection using one or more ultra short-range cellular data beacons. An ultra short-range cellular data beacon may include an ultra short-range cellular data communication interface to facilitate ultra short-range cellular data communication (e.g. Long-Term Evolution ("LTE")) with client devices. In an embodiment, a cellular data coverage area of the ultra short-range cellular data beacon covers a kiosk sized area. In an embodiment, a cellular data coverage area of the ultra short-range cellular data beacon is less than 10 meters. In an alternative embodiment, a cellular data coverage area of the ultra short-range cellular data beacon is less than 5 meters. The ultra short-range cellular data beacons may be configured to periodically initiate an electronic handshake with in-range client devices using the ultra short-range cellular data communication interface and receive a client device identifier (e.g. International Mobile Equipment Identity ("IMEI") from the in-range client devices. The ultra short-range cellular data beacon may report the client device identifiers to a base station using a non-cellular communication interface (e.g. IEEE 802.11 protocols). In an embodiment, the ultra short-range cellular data beacon reports a receipt time of the electronic handshake with an in-range client device along with the client device identifier to the base station. The base station may be in communication with a group of ultra short-range cellular data beacons and thus be able to track client devices as the client devices move between ultra short-range cellular data beacons by logging when a particular ultra short-range cellular data beacon was able to complete an electronic handshake using the ultra short-range cellular data communication interface of the particular ultra short-range cellular data beacon.

The ultra short-range cellular data beacons may be battery powered and save energy by only periodically initiating electronic handshakes to in-range client devices and/or only periodically reporting the client device identifiers to the base station. In an embodiment, the ultra short-range cellular data beacon is a wearable ultra short-range cellular data beacon and includes an attachment mechanism for attaching to clothing or a person.

Intentionally designing a coverage area of the short-range cellular data beacon to be ultra short-range rather than the conventional maximizing of the coverage area of the cellular data may allow for higher resolution proximity detection of client devices having cellular data radios. The smallest conventional "cells" are powered and wired to facilitate real-time voice and video calls and to provide a large cellular coverage area. In an embodiment of the disclosure, using cellular data (e.g. LTE) rather than other wireless protocols allows for passive proximity detection that won't inconvenience the user of a client device by requiring a login to Wi-Fi or a BlueTooth pairing of the client device, for example, because the user is already registered with a cellular carrier to complete electronic handshakes for the cellular data. The cellular data may include cellular data protocols commonly referred to as 2G/3G/4G/5G/LTE.

In one example implementation, a retail environment includes a base station and a plurality of ultra short-range cellular data beacons. The ultra short-range cellular data beacons may be in fixed locations in a retail environment and have non-overlapping coverage areas. In one embodiment, the ultra short-range cellular data beacons may be in fixed locations and have overlapping coverage areas. The base station may collect client device identifiers and time stamps of the electronic handshakes completed by the ultra short-range cellular data beacons to map out where in the retail environment that the customers of the store (as indicated by their smartphone client devices, for example) are spending time.

In one example implementation, one or more ultra short-range cellular data beacons may be worn by associates in a retail environment or tradeshow environment. When the wearable ultra short-range cellular data beacons come within range of a base station (e.g. within Wi-Fi range), the wearable ultra short-range cellular data beacons may transmit reporting messages to the base station that include a client device identifier and a time stamp representing when the client device identifier was received via cellular data. Hence, the base station may receive data for determining how long the associate spent with clients or tradeshow participants. The wearable ultra short-range cellular data beacons may have overlapping coverage areas with fixed ultra short-range cellular data beacons as the sales associates wearing the wearable ultra short-range cellular data beacons move around a retail environment or tradeshow environment, in one illustrative example implementation.

The techniques described herein may be implemented in a number of ways. Example implementations are provided below with reference to the following FIGS. 1-7.

FIG. 1 illustrates an example architecture 100 including an example base station 110 and an example ultra short-range cellular data beacon 120 for detecting a proximity of an in-range client device 150.

Base station 110 includes processing logic 111, memory 113, a network interface 116, and a local wireless interface 119, in the illustrated embodiment. In FIG. 1, ultra short-range cellular data beacon 120 includes processing logic 121, a memory 123, a local wireless interface 126, and an ultra short-range cellular data interface 129 that includes an antenna 127. In an embodiment, ultra short-range cellular data beacon 120 is a wearable ultra short-range cellular data beacon 120 and may include an attachment mechanism 189 for attaching to or attaching with a body part (e.g. wrist or arm) or clothing. In some embodiments beacon 120, may be coupled to receive electrical power from an auxiliary battery pack for extended use. In-range client device 150 is in range of a coverage area of ultra short-range cellular data interface 129. In-range client device 150 includes a device identifier 151. Architecture 100 also includes a local computing device 191 and a processing device 199, in FIG. 1.

The term "processing logic" (e.g. 111, 121, 208, and/or 408) in this disclosure may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein.

A memory" or "memories" (e.g. 113, 123, 212 and/or 412) described in this disclosure may include volatile or non-volatile memory architectures.

In-range client device 150 may be a feature phone, a smartphone, a tablet computer, a phablet, an embedded computer system, a UAV (Unmanned aerial vehicle), a robot, an Internet of Things (JOT) device, or any other device that is capable of accessing cellular data. Example cellular data standards include Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. In-range client device 150 may include a chipset that includes hardware components that enable the in-range client device 150 to communicate with multiple communication networks, such as a wireless carrier network and a remote network. For example, the hardware components may include processing logic, a modem, a transceiver, an antenna to facilitate cellular data transmission and reception, and/or so forth. In this way, the in-range client device 150 may transmit data to the multiple communication networks including wireless carrier networks and receive data back from the multiple communication network. A chipset of the in-range client device 150 may further include software components that encodes and routes data to the multiple communication network via the hardware components. In FIG. 1, in-range client device 150 is configured to complete an electronic handshake with ultra short-range cellular data beacon 120 via cellular data communication channel 193.

Ultra short-range cellular data beacon 120 includes ultra short-range cellular data communication interface 129 that includes an antenna 127 to facilitate ultra short-range cellular data communication with client devices that are in-range of the antenna 127. In an embodiment, the cellular data coverage area of antenna 127 is a pre-determined range. The predetermined range may be less than 10 meters, less than 5 meters, or any other range that is intentionally limited to increase the resolution of proximity detection. The cellular data coverage area of antenna 127 may have a configurable range that allows for individual tuning of different beacons 120. Configuring the cellular data coverage area of antenna 127 may be achieved using local wireless 126, by a Universal Serial Bus (USB) connection, by Joint Test Action Group (JTAG) support, or otherwise. Configuring the cellular data coverage area of antenna 127 may include changing a variable stored in memory 123 that is used as a gain factor on an amplifier configured to drive antenna 127. Conventionally, cellular data antennas are designed to maximize cellular data coverage to reach as many client devices. However, the cellular data coverage area of ultra short-range cellular data beacon 120 is intentionally limited to ultra short-range to increase the resolution for proximity detection. The cellular data coverage area of ultra short-range cellular data beacon 120 may be limited by reducing the broadcast electrical power driven onto antenna 127, for example. Antenna 127 may be an omni-directional antenna or a directional (e.g. yagi) antenna.

In an embodiment, ultra short-range cellular data beacon 120 does not have a backhaul connection to wireless carrier network because the ultra short-range cellular data beacon 120 is not configured to facilitate cellular voice calls, video calls, and data streaming. Eliminating the hardware and electrical power requirements to facilitate voice calls, video calls, and data streaming may allow the ultra short-range cellular data beacon 120 to be built substantially smaller, lighter, and less expensively. These features may also contribute to the wearability of embodiment where ultra short-range cellular data beacon 120 is a wearable. Conventionally, cellular data cells are designed specifically for the purpose of providing real-time voice calls, video calls, and cellular data so an ultra short-range cellular data beacon 120 without a backhaul connection represents a significant departure from conventional cellular data cells.

Processing logic 121 may be coupled to ultra short-range cellular data interface 129 and coupled to the local wireless interface 126. Local wireless interface 126 is configured to communicate with local wireless interface 119 of base station 119 via local communication channel 125. In an alternative embodiment (not illustrated), local wireless interface 119 and 126 are wired communication interfaces (e.g. Ethernet). In FIG. 1, local communication channel 125 may adhere to an IEEE 802.11 standard (i.e. Wi-Fi), a BlueTooth protocol such as BlueTooth Low Energy ("BLE"), or other wireless communication protocol. Memory 123 of ultra short-range cellular data beacon 120 may be coupled to processing logic 121. Memory 123 may store instructions that are accessible to processing logic 121 to execute. In the illustrated embodiment, memory 123 includes a beacon identifier 128 that uniquely identifies ultra short-range cellular data beacon 120.

In an embodiment, ultra short-range cellular data beacon 120 periodically initiates an electronic handshake with in-range client devices (e.g. device 150) by sending an electronic handshake message 153 to in-range client devices via an ultra short-range cellular data interface 129 over cellular data communication channel 193. In one embodiment, the periodic electronic handshake initiation is once every five minutes. In one embodiment, the periodic electronic handshake initiation is once every minute. In one embodiment, the periodic electronic handshake initiation is once every 15 seconds. Other intervals are possible. Longer intervals may save electrical power for implementations where beacon 120 is battery powered. In an embodiment, ultra short-range cellular data beacon 120 initiates an electronic handshake based on an interaction with in-range client device 150 such as a triggering event or a button press. In an embodiment, ultra short-range cellular data beacon 120 initiates an electronic handshake based on an interaction (e.g. button press) between the beacon 120 and a wearer of the beacon 120.

Client devices that are in-range may receive the electronic handshake message 153 from beacon 120 and respond with an electronic handshake response 155 over cellular data communication channel 193. The electronic handshake response 155 may include the client device identifier 151 of the in-range client device(s) 150. In one embodiment, the client device identifier 151 includes an IMEI (International Mobile Equipment Identity) number that uniquely identifies the client device 150. In one embodiment, the client device identifier 151 includes a Session Initiation Protocol (SIP) identity, in an IP Multimedia Subsystem (IMS) architecture, for example. In an embodiment, electronic handshake response 155 includes Global Positioning System (GPS) coordinates sensed by a GPS receiver onboard in-range client device 150, where the GPS coordinates are sensed closely in-time with the electronic handshake such that the GPS coordinates represent GPS coordinates of the in-range client device near the time of the electronic handshake. Having the GPS coordinates of the in-range client device may aid in proximity detection analysis. Ultra short-range cellular data interface 129 may receive the electronic handshake response 155 from the in-range client device(s) 150. In an embodiment, ultra short-range cellular data beacon 120 may disengage from in-range client devices 150 subsequent to completing the electronic handshake so that the any voice connection or cellular data communication by the client devices 150 with a traditional cellular tower is not affected.

A reporting message 161 may be generated by processing logic 121 that includes the client device identifier 151. The reporting message may be transmitted to the local wireless interface 119 of base station 110 via local communication channel 125. In an embodiment (not illustrated), the reporting message includes both the client device identifier 151 and the beacon identifier 128. In an embodiment, GPS coordinates sensed by a GPS receiver (not illustrated) of beacon 120 are included in the reporting message. In an embodiment, the transmitting of reporting message 161 is temporally responsive to receiving the electronic handshake response from the in-range client device 150. In an alternative embodiment, the transmitting of the reporting message 161 is performed periodically by beacon 120 and not temporally responsive to receiving the electronic handshake response from the in-range client device 150. In an embodiment, the transmission of reporting message 161 is scheduled in periodic intervals and the reporting message(s) 161 are transmitted in adherence with a pre-determined schedule. In one embodiment, the transmission of reporting message(s) is once every five minutes. In one embodiment, the transmission of reporting message(s) is once every minute. In one embodiment, the transmission of reporting message(s) is once every 15 seconds. Other intervals are possible. Longer intervals may save electrical power for implementations where beacon 120 is battery powered. The intervals of initiating the electronic handshake message 153 and transmitting the reporting message(s) 161 may be the same or may be different. In an embodiment, the electronic handshake is initiated every 15 seconds and the transmission of the reporting message(s) 161 is every five minutes.

In an embodiment, handshake time data representative of a receipt time of an electronic handshake response 155 being received by ultra short-range cellular data interface 129 is generated by ultra short-range cellular data beacon 120. The handshake time data may be included in the reporting message 161 transmitted to base station 110. In an embodiment, the reporting message 161 includes the handshake time data, the client device identifier 151, and the beacon identifier 128 which informs base station 110 which ultra short-range cellular data beacon 120 sensed a client device, which client device was sensed, and the time it was sensed.

Processing logic 111 of base station 110 may be coupled to local wireless interface 119 and network interface 116. Memory 113 of base station 110 may be coupled to processing logic 111. Memory 113 may store instructions that are accessible to processing logic 111 to execute. In an embodiment, base station 110 generates a pairing 171 that includes the client device identifier 151 and the beacon identifier 128 and transmits the pairing 171 to a processing device 199 via communication channel 197. Processing device 199 may be a server. The server may be in a cloud infrastructure. Communication channel 197 may be routed through intermediary networks such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network. In an embodiment, network interface 116 includes a long-range LTE (Long-Term Evolution) interface that is configured to communicate with cells of a wireless carrier network.

In an embodiment, pairing 171 includes a request for client account data 181 associated with the client device identifier 151 included in pairing 171. Processing device 199 may provide client account data 181 in response to receiving a request from base station 110. The client account data 181 may include the name of the user/subscriber of client device 150, a phone number associated with client device 150, a log of support calls or technical details (including cellular data usage) regarding the client device 150 identified by the client device identifier 151. In an embodiment, the client account data and the beacon identifier are transmitted as display data 183 to local computing device 191 via communication channel 195. In one implementation, communication channel 195 is Wi-Fi and local computing device 191 is a tablet. In one implementation, the display data 183 rendered to local computing device 191 may then show a sales associate a mapping of a location of a retail environment corresponding to the ultra short-range cellular data beacon 120 that detected (via a completed electronic handshake) the client device 150 associated with the account data.

Figure 2:
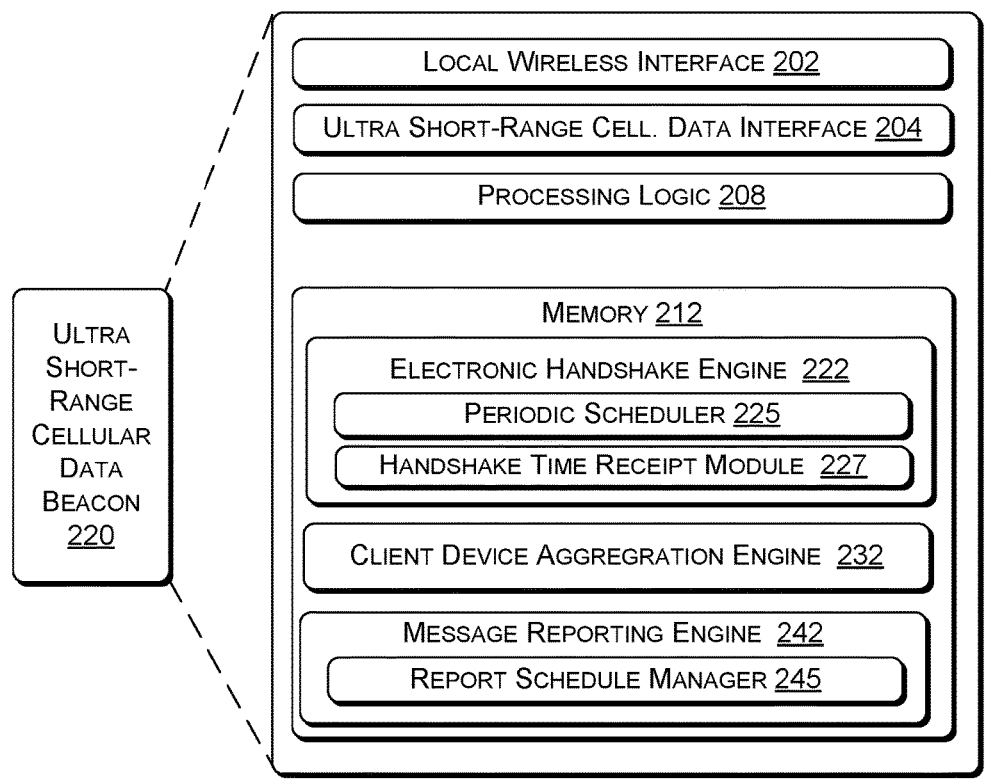
FIG. 2 is a block diagram showing various components of an example ultra short-range cellular data beacon that is configured to initiate electronic handshakes with client devices using an ultra short-range cellular data communication interface.

FIG. 2 is a block diagram showing various components of an example ultra short-range cellular data beacon 220 that is configured to initiate electronic handshakes with client devices using an ultra short-range cellular data communication interface. Ultra short-range cellular data beacon 220 is one example of ultra short-range cellular data beacon 120.

Ultra short-range cellular data beacon 220 includes a local wireless interface 202, an ultra short-range cellular data interface 204, processing logic 208, and a memory 212. The memory 212 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

Memory 212 includes an electronic handshake engine 222 that includes a periodic scheduler 225 and a handshake time receipt module 227. The local wireless interface 202 may include wireless components that enable the beacon 220 to transmit or receive data to/from a base station (e.g. 110). Local wireless interface 202 is an example of local wireless interface 126. Ultra short-range cellular data interface 204 is an example of ultra short-range cellular data interface 129. Ultra short-range cellular data interface 204 may include wireless components that enable the beacon 220 to transmit or receive data to/from via cellular data protocols commonly referred to as 2G/3G/4G/5G/LTE to in-range client devices. Processing logic 208 is an example of processing logic 121 and memory 212 is an example of memory 123.

Memory 212 also includes a client device aggregation engine 232. Memory 212 further includes message reporting engine 242 that includes report schedule manager 245. Further discussion of electronic handshake engine 222, client device aggregation engine 232, and message reporting engine 242 will be addressed in association with processes described in FIGS. 5-7.

Figure 3:
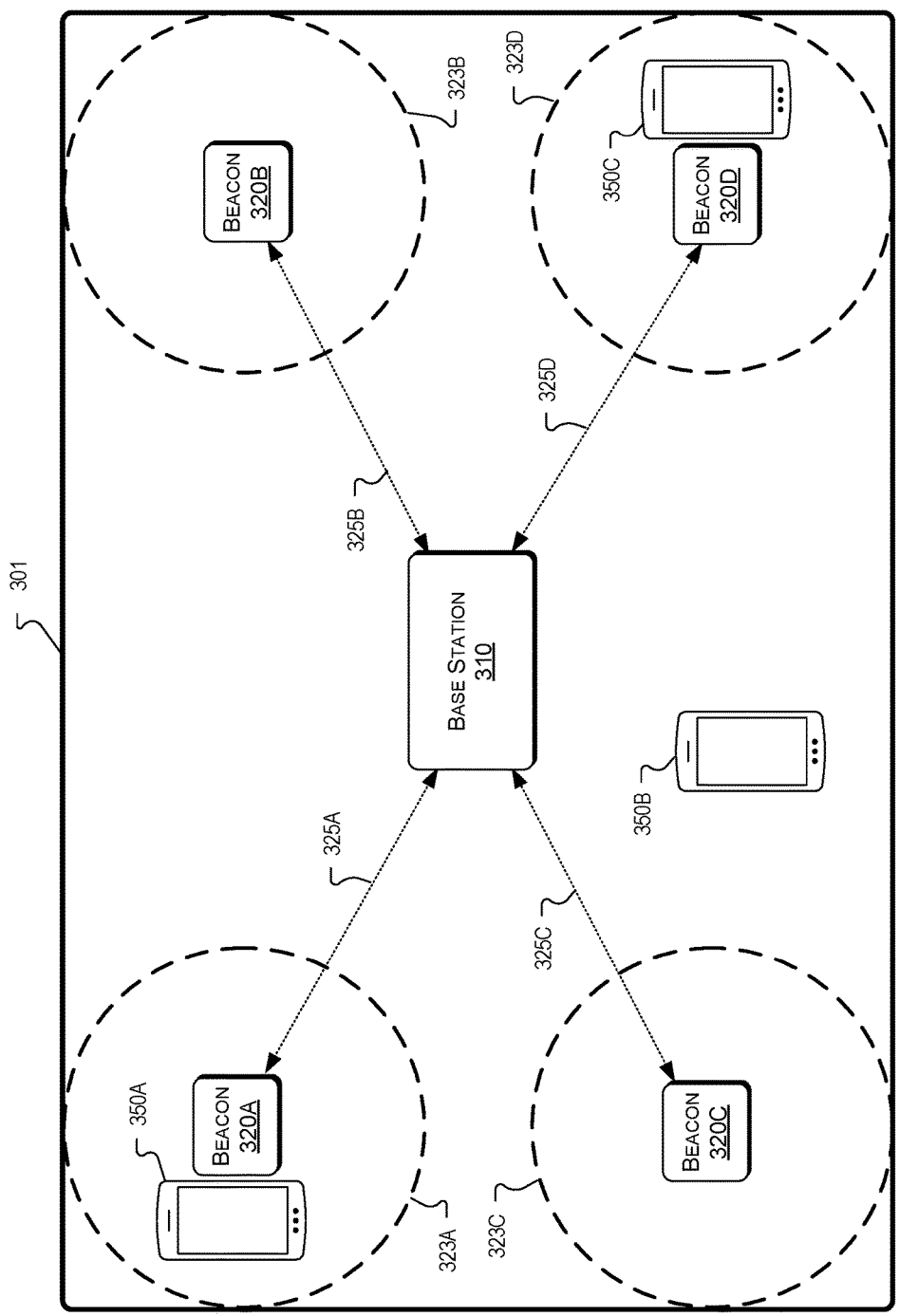
FIG. 3 is a block diagram plan view of a detection environment that includes a base station and ultra short-range cellular data beacons.

FIG. 3 is a block diagram plan view of a detection environment 301 that includes a base station 310 and ultra short-range cellular data beacons 320A, 320B, 320C, and 320D (collectively referred to as beacons 320). In the example detection environment 301 illustrated in FIG. 3, beacon 320A has a cellular data coverage area 323A and beacon 320A communicates with base station 310 via communication channel 325A. Similarly, beacon 320B has a cellular data coverage area 323B and beacon 320B communicates with base station 310 via communication channel 325B, beacon 320C has a cellular data coverage area 323C and beacon 320C communicates with base station 310 via communication channel 325C, and beacon 320D has a cellular data coverage area 323D and beacon 320D communicates with base station 310 via communication channel 325D. Communication channels 325 may have the characteristics of communication channel 193, in FIG. 1. In FIG. 3, the cellular data coverage areas of each of the beacons do not overlap. In FIG. 3, client device 350A is an in-range client device to beacon 320A because it is within cellular data coverage area 323A. Similarly, client device 350D is an in-range client device to beacon 320D because it is within cellular data coverage area 323D.

Client device 350B is not an in-range client device to any beacon because it is outside the illustrated coverage areas. However, in some implementations, a sales associate may wear an ultra short-range cellular data beacon (not illustrated) and client device 350B may become an in-range client device to the wearable ultra short-range cellular data beacon when the client device 350B enters the cellular data coverage area of the wearable ultra short-range cellular data beacon. In some contexts, a client device may be an "in-range client device" to more than one ultra short-range cellular data beacon at the same time and each ultra short-range cellular data beacon may successfully complete an electronic handshake with the in-range client device while the client device is in an overlapping coverage area. Detection environment 301 may be a retail store environment, a sporting event, a conference, a tradeshow, or otherwise.

Figure 4:
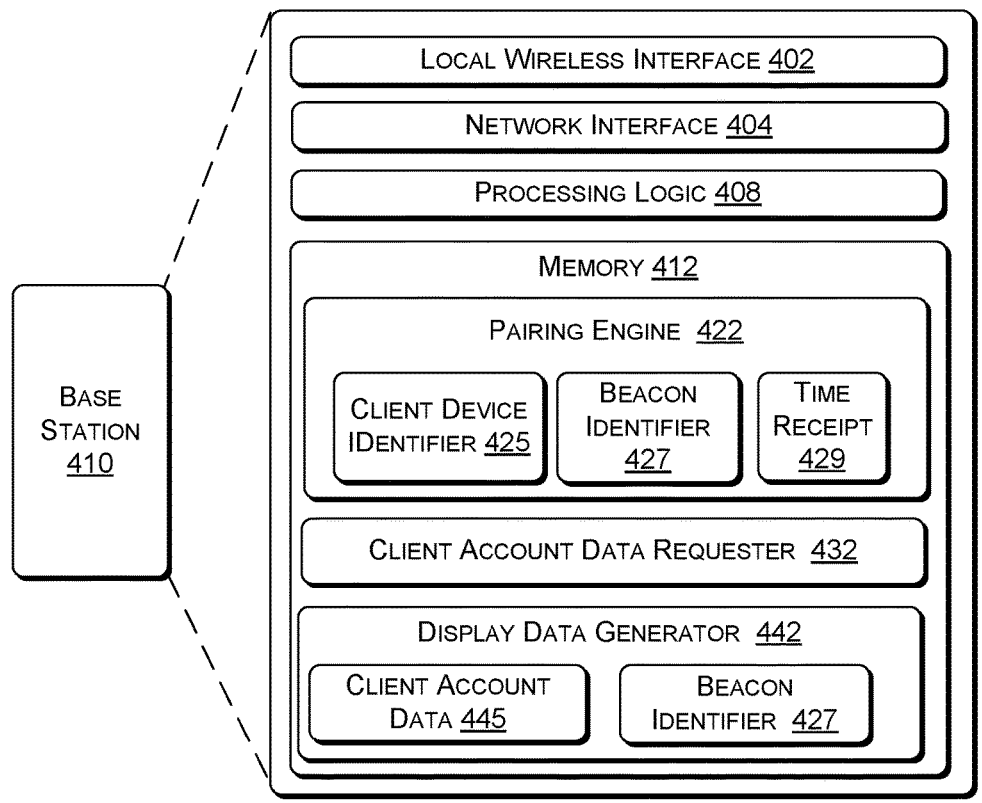
FIG. 4 is a block diagram showing various components of an example base station that is configured to receive a reporting message from an ultra short-range cellular data beacon and generate a pairing that includes a client device identifier and a beacon identifier of the ultra short-range cellular data beacon that received an electronic handshake response from a client device.

FIG. 4 is a block diagram showing various components of an example base station 410 that is configured to receive a reporting message from an ultra short-range cellular data beacon and generate a pairing that includes a client device identifier and a beacon identifier of the ultra short-range cellular data beacon that received an electronic handshake response from a client device. Base station 410 is one example of base station 110.

Base station 410 includes a local wireless interface 402, a network interface 404, processing logic 408, and a memory 412. The local wireless interface 402 may include wireless components that enable the base station 410 to transmit or receive data to/from an ultra short-range cellular data beacon (e.g. 120). Local wireless interface 402 is an example of local wireless interface 119. Network interface 404 is an example of network interface 116. In an embodiment, network interface 404 includes an Ethernet interface. In an embodiment, network interface 404 includes an LTE cellular data interface that is configured to communicate with cells of a wireless carrier network. In this case, the LTE cellular data interface is long-range compared to the ultra short-range of ultra short-range cellular data beacon 120/220. Processing logic 408 is an example of processing logic 111 and memory 412 is an example of memory 113.

The memory 412 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

Memory 412 includes pairing engine 422, client account data requester 432, and display data generator 442. Pairing engine 422 includes a client device identifier 425, a beacon identifier 427, and a time receipt 429, in FIG. 4. Display data generator 442 includes client account data 445, and the beacon identifier 427, in the illustrated embodiment. Further discussion of pairing engine 422, client account data requester 432, and display data generator 442 will be addressed in association with processes described in FIGS. 5-7.

Figure 5:
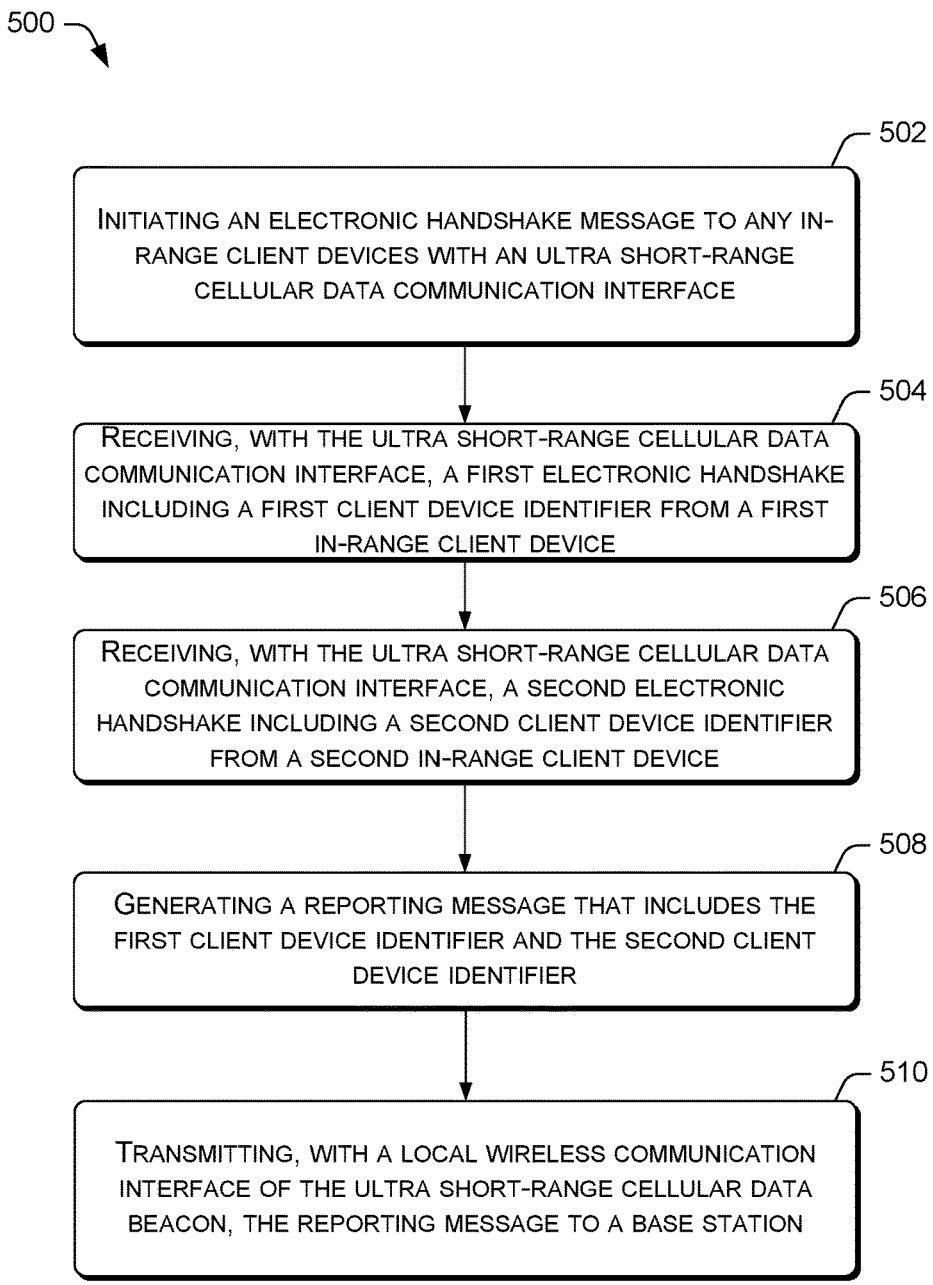
FIG. 5 is a flow diagram of an example process for detecting in-range client devices with ultra short-range cellular data beacons and transmitting a reporting message including the client device identifiers of the in-range client devices to a base station.
Figure 6:
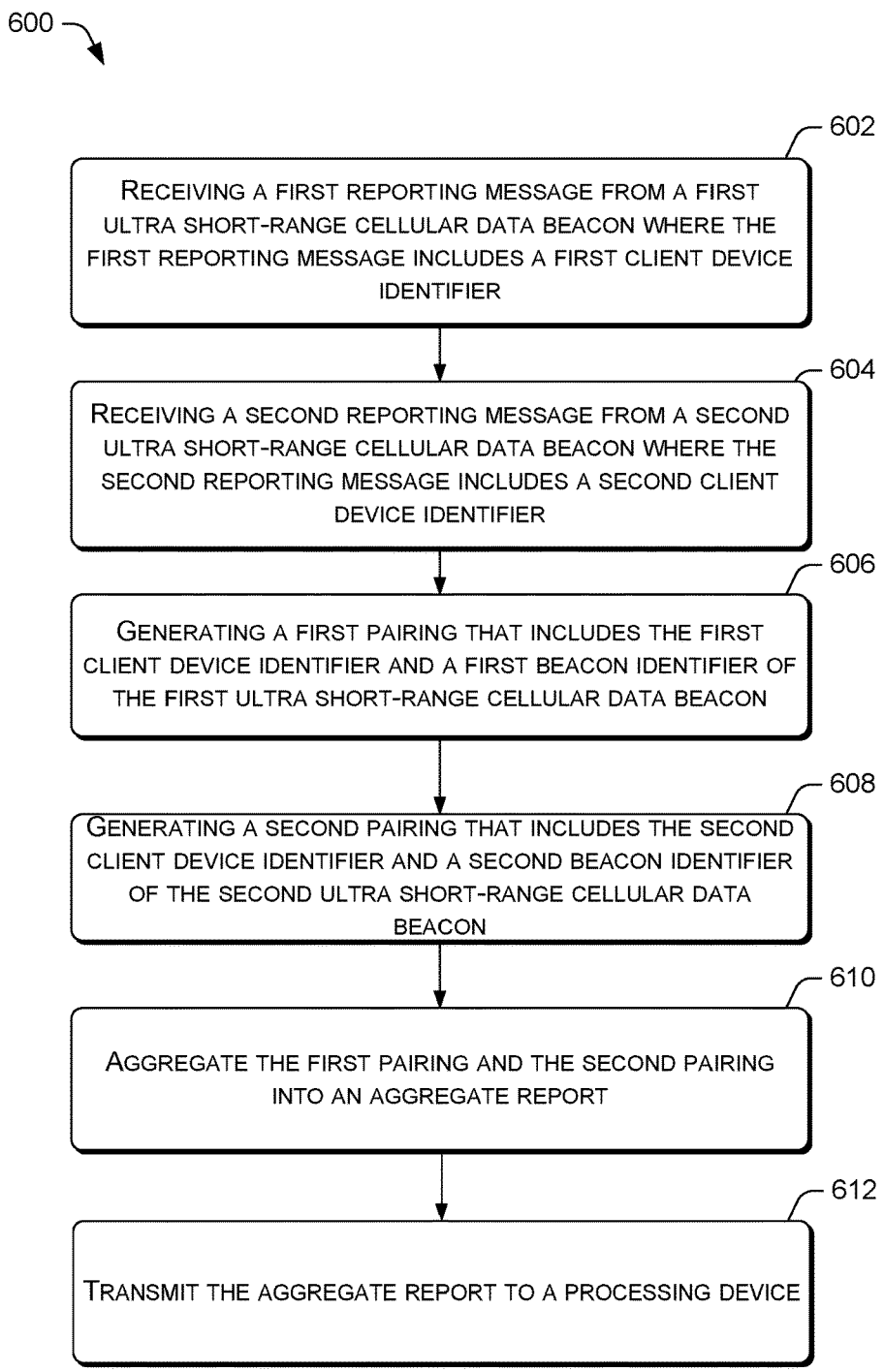
FIG. 6 is a flow diagram of an example process for generating an aggregate report including first and second client device identifiers and first and second beacon identifiers.
Figure 7:
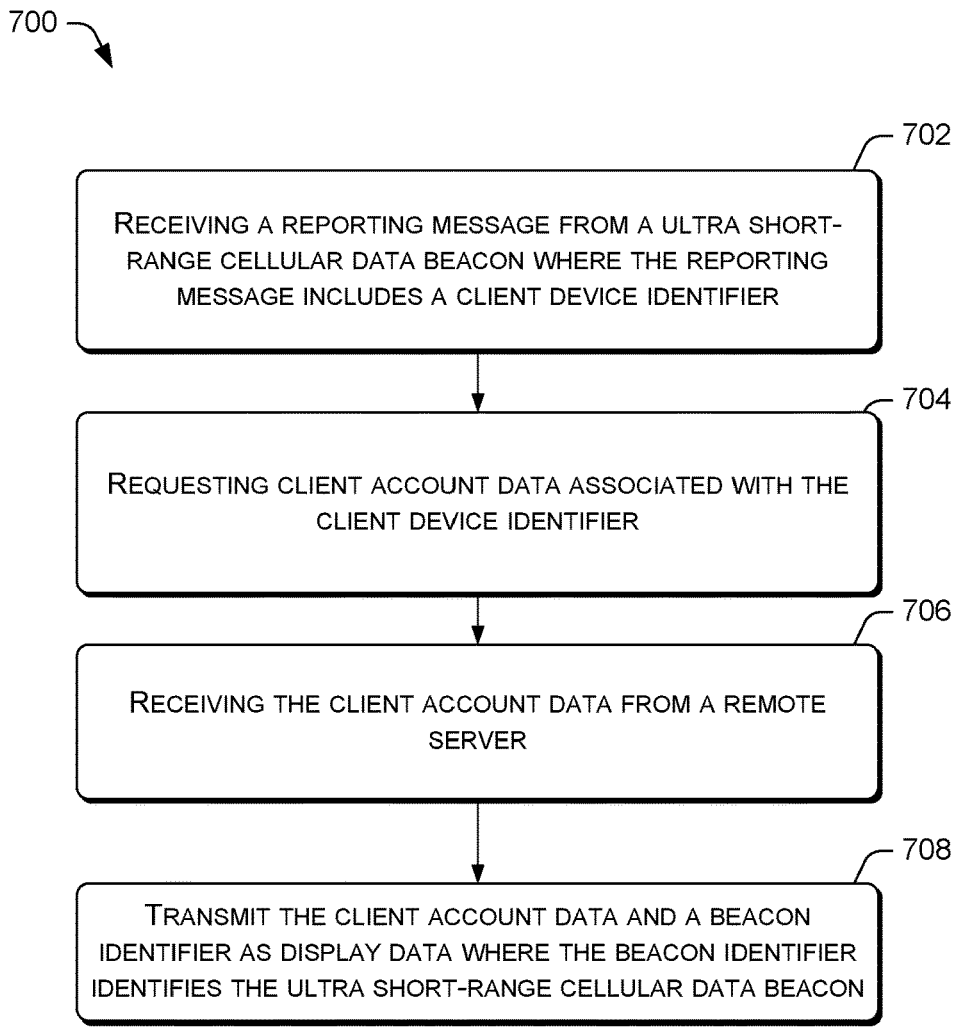
FIG. 7 is a flow diagram of an example process for requesting client account data and transmitting the client account data and a beacon identifier as display data.

FIGS. 5-7 present illustrative processes 500-700 for proximity detection using ultra short-range cellular data beacon(s). Each of the processes 500-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process.

FIG. 5 is a flow diagram of an example process 500 for detecting in-range client devices with ultra short-range cellular data beacons and transmitting a reporting message including the client device identifiers of the in-range client devices to a base station. Process 500 may be executed by an ultra short-range cellular data beacon such as beacon 120, 220, and/or 320. At block 502, an ultra short-range cellular data communication interface of an ultra short-range cellular data beacon initiates an electronic handshake message to any in-range client devices. The cellular data coverage area of an antenna of the ultra short-range cellular data communication interface is less than 10 meters, in an embodiment. In an embodiment, the ultra short-range cellular data communication utilizes LTE protocols to initiate the electronic handshake message to in-range client devices.

At block 504, the ultra short-range cellular data communication interface receives a first electronic handshake response from a first in-range client device of the in-range client devices. The first electronic handshake response includes a first client device identifier of the first in-range client device. In an embodiment, the first electronic handshake response is received in accordance with LTE protocols.

At block 506, the ultra short-range cellular data communication interface receives a second electronic handshake response from a second in-range client device of the in-range client devices. The second electronic handshake response includes a second client device identifier of the second in-range client device. In an embodiment, the second electronic handshake response is received in accordance with LTE protocols. In an embodiment, the first client device identifier includes a first IMEI (International Mobile Equipment Identity) number and the second client device identifier includes a second IMEI number. In some embodiments, additional electronic handshake responses from additional in-range client devices may be received by the ultra short-range cellular data communication interface where the additional electronic handshake responses include additional client device identifiers that identify the additional in-range client devices.

Electronic handshake engine 222 may execute instructions to initiate the electronic handshake messages of block 502. Electronic handshake engine 222 may also execute instructions to handle the receipt of the electronic handshake responses of blocks 504 and 506. Handshake time receipt module 227 may generate a time receipt for each electronic handshake response received and store the time receipt. The time receipt may be associated (in memory 212) with the client device identifier received in the electronic handshake response that prompted the time receipt in memory 212. Periodic scheduler 225 may include a programmable variable that controls how often electronic handshake messages are initiated by the ultra short-range cellular data interface 204 of ultra short-range cellular data beacon 220 and periodic scheduler 225 may schedule the electronic handshake messages according to the programmable variable.

At block 508, a reporting message is generated that includes the first client device identifier and the second client device identifier. In embodiments where additional electronic handshake responses are received, the reporting message may include the additional client device identifiers that identify the additional in-range client devices.

At block 510, a local wireless communication interface of the ultra short-range cellular data beacon transmits the reporting message to a base station. The local wireless communication interface may be different from the ultra short-range cellular data communication interface. In an embodiment, the reporting message is sent to the base station using IEEE 802.11 protocols. In an embodiment, the reporting message is sent to the base station using BLE. Generating the reporting message (block 508) and/or transmitting the reporting message (block 510) may be initiated according to a pre-determined reporting schedule. The pre-determined reporting schedule may space the transmissions of the reporting message by a predetermined time interval. In one example, the predetermined time interval is one minute. In an embodiment, the ultra short-range cellular data beacon cycles through execution blocks 502, 504, and 506 multiple times prior to continuing to blocks 508 and 510.

Block 508 may be executed by client device aggregation engine 232. Aggregating the client device identifiers into a single reporting message that is transmitted periodically may contribute to increased power efficiencies of an ultra short-range cellular data beacon such that it can operate on battery power. Block 510 may be executed by message reporting engine 242. Report schedule manager 245 of message reporting engine 242 may include a programmable variable that controls how often reporting messages are transmitted by local wireless interface 202 to a base station and report schedule manager 245 may schedule the reporting message transmissions according to the programmable variable.

FIG. 6 is a flow diagram of an example process 600 for generating an aggregate report including first and second client device identifiers and first and second ultra short-range cellular beacon identifiers. Process 600 is executed by base station 110, 310, or 410, in some embodiments.

At block 602, a first reporting message from a first ultra short-range cellular data beacon (e.g. 320A) is received where the first reporting message includes a first client device identifier of a first client device that was in-range of an ultra short-range cellular data interface of the first ultra short-range cellular data beacon. In an embodiment, the first reporting message also includes a first time receipt of a first electronic handshake response including the first client device identifier received by the ultra short-range cellular data interface of the first ultra short-range cellular data beacon. In an embodiment, the first reporting message also includes a first beacon identifier that uniquely identifies a first ultra short-range cellular data beacon that is sending the first reporting message. The first client device identifier, the first beacon identifier, and the first time receipt may be stored in the respective client device identifier database 425, beacon identifier database 427, and time receipt database 429 of the pairing engine 422 in memory 412 of FIG. 4.

At block 604, a second reporting message from a second ultra short-range cellular data beacon (e.g. 320B) is received where the second reporting message includes a second client device identifier of a second client device that was in-range of an ultra short-range cellular data interface of the second ultra short-range cellular data beacon. In an embodiment, the second reporting message also includes a second time receipt of a second electronic handshake response including the second client device identifier received by the ultra short-range cellular data interface of the second ultra short-range cellular data beacon. In an embodiment, the second reporting message also includes a second beacon identifier that uniquely identifies a second ultra short-range cellular data beacon that is sending the first reporting message. The second client device identifier, the second beacon identifier, and the second time receipt may be stored in the respective client device identifier database 425, beacon identifier database 427, and time receipt database 429 of the pairing engine 422 in memory 412 of FIG. 4.

At block 606, a first pairing that includes the first client device identifier and a first beacon identifier of the first ultra short-range cellular data beacon is generated. At block 608, a second pairing that includes the second client device identifier and a second beacon identifier of the second ultra short-range cellular data beacon is generated. Blocks 606 and 608 may be executed by instructions associated with the pairing engine 422 of FIG. 4 by accessing the client device identifier database 425 and the beacon identifier database 427 to access the client device identifier and the beacon identifiers to generate the first and second pairing.

In block 610, the first pairing and the second pairing are aggregated into an aggregate report. In block 612, the aggregate report is transmitted to a processing device (e.g. 199). In an embodiment, the processing device is a remote server and the aggregate report is transmitted to the remote server over the internet. The processing device may perform processing functions using the data included in the aggregate report and make the data accessible to authorized personnel. In an embodiment, the client device identifiers, the time receipts, and the beacon identifiers are used to map the time that a particular client device spent near a particular ultra short-range cellular data beacon.

FIG. 7 is a flow diagram of an example process 700 for requesting client account data and transmitting the client account data and a beacon identifier as display data. At block 702, a reporting message from an ultra short-range cellular data beacon is received. The reporting message may be received by a base station such as 110, 310, and/or 410. The reporting message includes a client device identifier of an in-range client device that completed an electronic handshake with the ultra short-range cellular data beacon.

At block 704, client account data associated with the client device identifier is requested. The client account data may be requested by the base station. In an embodiment, block 704 is performed by client account data requester 432 of memory 412 of base station 410 in FIG. 4.

In block 706, the client account data is received from a remote server. The remote server may identify the client account data from the client device identifier received in the request from the base station. The client account data may include the name of the user/subscriber of client device, a phone number associated with the client device, and a log of support calls or technical details (including cellular data usage) regarding the client device identified by the client device identifier.

In block 708, the client account data and a beacon identifier are transmitted as display data. Display data generator 442 may generate the display data by including the client account data 445 and the beacon identifier 427 in the display data. The beacon identifier identifies the ultra short-range cellular data beacon that completed the electronic handshake with the in-range client device. In an embodiment, the display data is transmitted to a computing device such as a tablet or smartphone. In one implementation, the display data is rendered to a computing device to present a map of a location of a retail environment corresponding to the ultra short-range cellular data beacon 120 that detected (via a completed electronic handshake) the client device associated with the account data. The display data may include multiple beacon identifiers from multiple ultra short-range cellular data beacons to map where the client device travelled over a particular time period.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed:

1. An ultra short-range cellular data beacon comprising:
   an ultra short-range cellular data communication interface including an antenna to facilitate ultra short-range cellular data communication with a plurality of client devices that are registered with a cellular carrier to complete an electronic handshake for cellular data;
   a local wireless communication interface to communicate with a base station;
   processing logic coupled to the ultra short-range cellular data communication interface and coupled to the local wireless communication interface; and
   a memory coupled to the processing logic, wherein the memory includes instructions that, when executed, cause the ultra short-range cellular data beacon to perform operations comprising:
   initiating, via the ultra short-range cellular data communication interface, the electronic handshake for cellular data with an in-range client device of the plurality of client devices, wherein initiating the electronic handshake includes sending an electronic handshake message to the in-range client device in accordance with a cellular data protocol;
   receiving, via the ultra short-range cellular data communication interface, an electronic handshake response from the in-range client device in accordance with the cellular data protocol, wherein the electronic handshake response includes a client device identifier of the in-range client device; and
   transmitting, with the local wireless communication interface, a reporting message to the base station, wherein the reporting message includes the client device identifier and handshake time data representative of a receipt time of the electronic handshake response.

2. The ultra short-range cellular data beacon of claim 1, wherein the transmitting the reporting message to the base station is performed periodically by the ultra short-range cellular data beacon.

3. The ultra short-range cellular data beacon of claim 1, wherein the client device identifier includes an IMEI (International Mobile Equipment Identity) number.

4. The ultra short-range cellular data beacon of claim 1, wherein the short-range cellular data beacon is a wearable short-range cellular data beacon including an attachment mechanism to attach the wearable short-range cellular data beacon to a person or clothing article worn by a person.

5. A computer-implemented method comprising:
   initiating, via an ultra short-range cellular data communication interface of an ultra short-range cellular data beacon, an electronic handshake for cellular data with a plurality of in-range client devices that are registered with a cellular carrier to complete the electronic handshake for cellular data, wherein initiating the electronic handshake includes sending an electronic handshake message to the plurality of in-range client devices in accordance with a cellular data protocol;
   receiving, via the ultra short-range cellular data communication interface, a first electronic handshake response from a first in-range client device of the plurality of in-range client devices, wherein the first electronic handshake response is received in accordance with the cellular data protocol and includes a first client device identifier of the first in-range client device;
   receiving, via the ultra short-range cellular data communication interface, a second electronic handshake response from a second in-range client device of the plurality of in-range client devices, wherein the second electronic handshake response is received in accordance with the cellular data protocol and includes a second client device identifier of the second in-range client device;
   generating a reporting message that includes the first client device identifier, the second client device identifier, first handshake time data representative of a first receipt time of the first electronic handshake response, and second handshake time data representative of a second receipt time of the second electronic handshake response; and
   transmitting, with a local wireless communication interface of the ultra short-range cellular data beacon, the reporting message to a base station, wherein the transmitting the reporting message is initiated according to a pre-determined reporting schedule, and wherein the local wireless communication interface is different from the ultra short-range cellular data communication interface.

6. The computer-implemented method of claim 5, wherein the pre-determined reporting schedule spaces the transmissions of the reporting message more than one minute apart.

7. The computer-implemented method of claim 5, wherein the first and second client device identifiers includes an IMEI (International Mobile Equipment Identity) number.

8. The computer-implemented method of claim 5, wherein the electronic handshake response includes the client device identifier of the in-range client device and Global Positioning System (GPS) coordinates sensed by a GPS receiver onboard the in-range client device, and wherein the GPS coordinates correspond to a time of the electronic handshake.

9. The computer-implemented method of claim 5, further comprising:
   disengaging from the in-range client device in response to determining that the electronic handshake is completed.

10. A system comprising:
    a base station including a first local wireless communication interface and a network interface; and
    at least one ultra short-range cellular data beacon including:
       an ultra short-range cellular data communication interface including an antenna to facilitate ultra short-range cellular data communication with a plurality of client devices that are registered with a cellular carrier to complete an electronic handshake for cellular data;
       a second local wireless communication interface to communicate with the first local wireless communication interface of the base station;
       processing logic coupled to the ultra short-range cellular data communication interface and coupled to the second local wireless communication interface; and
       a memory coupled to the processing logic, wherein the memory includes instructions that, when executed, cause the ultra short-range cellular data beacon to perform operations comprising:
          periodically initiating, via the ultra short-range cellular data communication interface, the electronic handshake for cellular data with an in-range client device of the plurality of client devices, wherein initiating the electronic handshake includes sending an electronic handshake message to the in-range client devices in accordance with a cellular data protocol;
          receiving, via the ultra short-range cellular data communication interface, an electronic handshake response from the in-range client device in accordance with the cellular data protocol, wherein the electronic handshake response includes a client device identifier of the in-range client device; and
          transmitting, with the second local wireless communication interface, a reporting message to the first local wireless communication interface of the base station, wherein the reporting message includes the client device identifier and handshake time data representative of a receipt time of the electronic handshake response.

11. The system of claim 10, wherein the base station is configured to:
    generate a pairing that includes the client device identifier and a beacon identifier of the ultra short-range cellular data beacon that received the electronic handshake response from the in-range client device; and
    transmit, via the network interface, the pairing to a processing device.

12. The system of claim 10, wherein the transmitting the reporting message to the base station is performed periodically by the ultra short-range cellular data beacon.

13. The system of claim 10, wherein the first local wireless communication interface and the second local wireless communication interface includes at least one of, a BlueTooth Low Energy interface or a Wi-Fi interface.

14. The system of claim 10, wherein the ultra short-range cellular data communication interface includes a LTE (Long-Term Evolution) data communication interface.

15. The system of claim 10, wherein the client device identifier includes an IMEI (International Mobile Equipment Identity) number.

16. The system of claim 10, wherein the network interface includes at least one of an Ethernet interface or a long-range LTE (Long-Term Evolution) interface.

17. The system of claim 10, wherein the base station is configured to:
  generate a first pairing that includes the client device identifier and a first beacon identifier of the ultra short-range cellular data beacon that received the electronic handshake response from the in-range client device;
  generate a second pairing that includes a second client device identifier and a second beacon identifier of a second ultra short-range cellular data beacon that received the second client device identifier from a second in-range client device;
  aggregate the first pairing and the second paring into an aggregate report; and
  transmit, via the network interface, the aggregate report to a processing device.

18. The system of claim 10, wherein transmitting the reporting message to the first local wireless communication interface of the base station is responsive to the ultra short-range cellular data beacon sensing coming back into range of the first local wireless communication interface.

19. The system of claim 10, wherein the ultra short-range cellular data beacon does not have a backhaul connection to a wireless carrier network.

20. The system of claim 10, wherein the base station is configured to:
  request, with the network interface, client account data associated with the client device identifier;
  receive, with the network interface, the client account data from a remote server; and
  transmit the client account data and a beacon identifier as display data for rendering to a display, wherein the beacon identifier identifies the ultra short-range cellular data beacon that received the electronic handshake response from the in-range client device.

* * * * *